US010298896B2

(12) United States Patent
Jiang et al.

(10) Patent No.: US 10,298,896 B2
(45) Date of Patent: May 21, 2019

(54) METHOD AND APPARATUS FOR GENERATING HDRI (71) Applicant: SZ DJI TECHNOLOGY CO., LTD., Shenzhen (CN)

(72) Inventors: Caigao Jiang, Shenzhen (CN); Zisheng Cao, Shenzhen (CN); Mingyu Wang, Shenzhen (CN); Taiwen Liang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 86 days.

(21) Appl. No.: 15/385,502

(22) Filed: Dec. 20, 2016

(65) Prior Publication Data
US 2017/0104971 A1    Apr. 13, 2017

Related U.S. Application Data (63) Continuation of application No. PCT/CN2014/080376, filed on Jun. 20, 2014.

(51) Int. Cl.
G06T 5/00    (2006.01)
H04N 9/64    (2006.01)
(Continued)

(52) U.S. Cl.
CPC .......... H04N 9/646 (2013.01); G06T 5/009 (2013.01); H04N 5/2355 (2013.01); H04N 9/68 (2013.01);
(Continued)

(58) Field of Classification Search
CPC combination set(s) only.
See application file for complete search history.

(56) References Cited

U.S. PATENT DOCUMENTS 5,012,333 A * 4/1991 Lee ............... H04N 1/4072
                                                   358/520
7,834,915 B2 * 11/2010 Wakazono .......... H04N 5/243
                                                   348/229.1
(Continued)

FOREIGN PATENT DOCUMENTS

CN    101707666 A    5/2010
CN    102637292 A    8/2012
(Continued)

OTHER PUBLICATIONS

The World Intellectual Property Organization (WIPO) International Search Report for PCT/CN2014/080376 dated Mar. 23, 2015 p. 1-6.
(Continued)

Primary Examiner — Tsung Yin Tsai
(74) Attorney, Agent, or Firm — Anova Law Group, PLLC (57) ABSTRACT The present invention provides a method and apparatus for generating a high dynamic range image (HDRI). After acquiring a first illuminance diagram, a base layer and detail layers are extracted from the first illuminance diagram, where the base layer contains low frequency information of the first illuminance diagram and the detail layers contain high frequency information of the first illuminance diagram. The dynamic range of the base layer is then compressed while dynamic ranges of the detail layers remain uncompressed. Further, a second illuminance diagram is generated from the first illuminance diagram by fusing the base layer with the compressed dynamic range and the detail layers, the second illuminance diagram is mapped onto a plurality of preset color channels; and the images on the plurality of preset color channels are fused into the HDRI. Therefore, the detail information in the original illuminance diagram can be preserved.

11 Claims, 5 Drawing Sheets (51) Int. Cl.
*H04N 9/69* (2006.01)
*H04N 5/235* (2006.01)
*H04N 17/00* (2006.01)
*H04N 17/02* (2006.01)
*H04N 9/68* (2006.01)

(52) U.S. Cl.
CPC ............ *H04N 9/69* (2013.01); *H04N 17/002* (2013.01); *H04N 17/02* (2013.01); *G06T 2207/20208* (2013.01)

(56) References Cited

U.S. PATENT DOCUMENTS

| | | | |
|---|---|---|---|
| 9,900,527 B2 * | 2/2018 | Uvarov | H04N 5/35581 |
| 2009/0161953 A1 * | 6/2009 | Ciurea | H04N 1/4074 |
| | | | 382/172 |
| 2010/0238190 A1 | 9/2010 | Ciurea | |
| 2011/0194618 A1 | 8/2011 | Gish et al. | |
| 2012/0081579 A1 | 4/2012 | Doepke | |
| 2012/0189206 A1 * | 7/2012 | Iketani | G06T 5/004 |
| | | | 382/190 |
| 2012/0236020 A1 * | 9/2012 | Paris | G06T 5/009 |
| | | | 345/589 |
| 2013/0121572 A1 * | 5/2013 | Paris | H04N 19/30 |
| | | | 382/166 |
| 2014/0112595 A1 * | 4/2014 | Huang | H04N 19/63 |
| | | | 382/264 |
| 2016/0328830 A1 * | 11/2016 | Pouli | H04N 5/57 |

FOREIGN PATENT DOCUMENTS

| | | |
|---|---|---|
| CN | 102938837 A | 2/2013 |
| CN | 104065939 A | 9/2014 |
| JP | 20060270622 A | 10/2006 |
| JP | 20090059058 | 3/2009 |

OTHER PUBLICATIONS

Yanhui Liu, Design and Implementation of High Dynamic Range Image Generating and Tone Mapping Displaying System, China Masters Theses Full-text Database, Information Technology Series, Mar. 15, 2013, 1-66.

* cited by examiner

METHOD AND APPARATUS FOR GENERATING HDRI

CROSS-REFERENCES TO RELATED APPLICATIONS

This application is a continuation application of International Application No. PCT/CN2014/080376, filed with the State Intellectual Property Office of P. R. China on Jun. 20, 2014, the entire contents of which are incorporated herein by reference.

TECHNICAL FIELD

The present invention relates to the field of image processing and, particularly, to a method and apparatus for generating a high dynamic range image (HDRI).

BACKGROUND OF THE INVENTION

A high dynamic range image (HDRI) has a wider dynamic range, which may be far wider than that can be rendered by an ordinary display device. Therefore, it is often necessary to compress the dynamic range of the HDRI when being generated in order to allow the HDRI to be displayed on an ordinary display device.

However, existing methods for generating HDRI may cause loss of the details in the HDRI.

SUMMARY OF THE INVENTION

In view of the above, embodiments of the present invention provide a method and an apparatus for generating an HDRI, which may solve the problem of losing details in the HDRI generated with an existing method.

To achieve the above objectives, the disclosed embodiments of the present invention provide a technical solution as follows:

A first aspect of the present invention provides a method for generating an HDRI, comprising:
acquiring a first illuminance diagram;
generating a second illuminance diagram from the first illuminance diagram, the second illuminance diagram being formed by fusing a base layer of which the dynamic range is compressed and detail layers, and the base layer and the detail layers being extracted from the first illuminance diagram;
mapping the second illuminance diagram onto preset color channels; and
fusing the images on the color channels into the HDRI.

In a first implementation of the first aspect of the present invention, said acquiring the first illuminance diagram may comprise:
generating a set of calibration equations for a camera response function from images I1, I2, . . . , IN having different exposure conditions, wherein N is the number of the images, and is an integer greater than or equal to 2;
solving the set of calibration equations for the camera response function by using a QR decomposition algorithm to obtain the camera response function and an illuminance logarithm, based on sampling pixel points selected from the images I1, I2, . . . , IN; and
obtaining the first illuminance diagram based on the camera response function and the illuminance logarithm.

In a second implementation of the first aspect of the present invention, said generating the set of calibration equations for the camera response function from the images I1, I2, . . . , IN may comprise:
acquiring the images I1, I2, . . . , IN; and
solving a preset objective function by a least square method to obtain the set of calibration equations for the camera response function, by using the images I1, I2, . . . , IN as known parameters.

In a third implementation of the first aspect of the present invention, the preset objective function may comprise:

$$O = \sum_{i=1}^{M}\sum_{j=1}^{N} \omega(Z_{i,j})[g(Z_{i,j}) - \ln E_i - \ln \Delta t_j]^2 + \lambda \sum_{Z=Z_{min}+1}^{Z_{max}-1} \omega(Z_{i,j})[g''(Z_{i,j})]^2$$

wherein, M is a total number of the pixel points of each image among the known parameters, $g(Z_{i,j}) = \ln E_i + \ln \Delta t_j$, $E_i$ is a scene illumination, $\Delta t_j$ is an exposure time of the current image $Z_{i,j}$, $Z_{i,j}$ is a pixel value of the current image, $\lambda$ is a control parameter, $\omega(Z_{i,j})$ is a weight function for the current image $Z_{i,j}$, $Z_{min}$ is a minimum value of the pixel value of the current image, and $Z_{max}$ is a maximum value of the pixel value of the current image.

In a fourth implementation of the first aspect of the present invention, the method may further comprise, before fusing the images on the color channels into the HDRI:
performing a Gamma correction respectively to the images on each of the color channels; and
fusing the images on the color channels into the HDRI may comprise:
fusing the Gamma-corrected images on the color channels into the HDRI.

In a fifth implementation of the first aspect of the present invention, said generating the second illuminance diagram from the first illuminance diagram may comprise:
extracting the base layer and the detail layers of the first illuminance diagram;
compressing the dynamic range of the base layer into a preset range; and
fusing the base layer of which the dynamic range is compressed and the detail layers into the second illuminance diagram.

In a sixth implementation of the first aspect of the present invention, extracting the base layer and the detail layers of the first illuminance diagram may comprise:
extracting the base layer and the detail layers of the first illuminance diagram by using a lifting wavelet transform algorithm; and
fusing the base layer of which the dynamic range is compressed and the detail layers into the second illuminance diagram may comprise:
fusing the base layer of which the dynamic range is compressed and the detail layers into the second illuminance diagram by using a lifting wavelet inverse transform algorithm.

A second aspect of the present invention provides an apparatus for generating HDRI, comprising:
an acquisition module for acquiring a first illuminance diagram;
a generation module for generating a second illuminance diagram from the first illuminance diagram, the second illuminance diagram being formed by fusing a base layer of which the dynamic range is compressed and detail layers, and the base layer and the detail layers being extracted from the first illuminance diagram;

a mapping module for mapping the second illuminance diagram onto a plurality of preset color channels; and a fusion module for fusing images on the plurality of preset color channels into the HDRI.

In a first implementation of the second aspect of the present invention, the acquisition module may specifically comprise:

an equation generating unit for generating a set of calibration equations for a camera response function from images I1, I2, ..., IN having different exposure conditions, wherein N is a total number of the images, and is an integer greater than or equal to 2;

a solving unit for solving the set of calibration equations for the camera response function by using a QR decomposition algorithm to obtain the camera response function and an illuminance logarithm, based on sampling pixel points selected from the images I1, I2, ..., IN; and an acquisition unit for obtaining the first illuminance diagram based on the camera response function and the illuminance logarithm.

In a second implementation of the second aspect of the present invention, the equation generating unit for generating the set of calibration equations for the camera response function from the images I1, I2, ..., IN may be used for:

acquiring the images I1, I2, ..., IN, and solving a preset objective function by a least square method to obtain the set of calibration equations for the camera response function by using the images I1, I2, ..., IN as known parameters.

In a third implementation of the second aspect of the present invention, the equation generating unit used for acquiring the images I1, I2, ..., IN and solving the preset objective function by using the least square method to obtain the calibration equation set for the camera response function by using the images I1, I2, ..., IN as known parameters may be used for:

acquiring the images I1, I2, ..., IN, and solving the preset objective function by using the least square method to obtain the set of calibration equations for the camera response function by using the images I1, I2, ..., IN as known parameters, and the preset objective function may be:

$$O = \sum_{i=1}^{M} \sum_{j=1}^{N} \omega(Z_{i,j})[g(Z_{i,j}) - \ln E_i - \ln \Delta t_j]^2 + \lambda \sum_{Z=Z_{min}+1}^{Z_{max}-1} \omega(Z_{i,j})[g''(Z_{i,j})]^2$$

wherein, M is the number of the pixel points of each image among the known parameters, $g(Z_{i,j}) = \ln E_i + \ln \Delta t_j$, $E_i$ is a scene illuminance, $\Delta t_j$ is an exposure time of the current image $Z_{i,j}$, $Z_{i,j}$ is a pixel value of the current image, $\lambda$ is a control parameter, $\omega(Z_{i,j})$ is a weight function for the current image $Z_{i,j}$, $Z_{min}$ is a minimum value of the pixel value of the current image, and $Z_{max}$ is a maximum value of the pixel value of the current image.

In a fourth implementation of the second aspect of the present invention, the apparatus may further comprise:

a correction module for performing a Gamma correction respectively to the images on each of the color channels before fusing the images on the color channels into the HDRI.

In a fifth implementation of the second aspect of the present invention, the fusion module for fusing the images on the color channels into the HDRI may be used for:

fusing the Gamma-corrected images on the color channels into the HDRI.

In a sixth implementation of the first second aspect of the present invention, the generation module may comprise:

an extraction unit for extracting the base layer and the detail layers of the first illuminance diagram;

a compression unit for compressing the dynamic range of the base layer into a preset range; and a fusion unit for fusing the base layer of which the dynamic range is compressed and the detail layers into the second illuminance diagram.

In a seventh implementation of the second aspect of the present invention, the extraction unit for extracting the base layer and the detail layers of the first illuminance diagram may be used for:

extracting the base layer and the detail layers of the first illuminance diagram by using a lifting wavelet transform algorithm.

In an eighth implementation of the second aspect of the present invention, the fusion unit for fusing the base layer of which the dynamic range is compressed and the detail layers into the second illuminance diagram may be used for:

fusing the base layer of which the dynamic range is compressed and the detail layers into the second illuminance diagram by using a lifting wavelet inverse transform algorithm.

According to the method and apparatus provided in the embodiments of the present invention, after a first illuminance diagram is acquired, a second illuminance diagram is generated from the first illuminance diagram, wherein the second illuminance diagram is formed by fusing a base layer of which the dynamic range is compressed and detail layers, and wherein the base layer and the detail layers are extracted from the first illuminance diagram; then the second illuminance diagram is mapped onto preset color channels, and the images on the color channels are fused into an HDRI. It can be seen that during the process of generating the HDRI, only the dynamic range of the base layer in the illuminance diagram is compressed, whereas the detail layers are not compressed. Therefore, the detail information in the original illuminance diagram can be preserved to the largest extent, thereby avoiding the problem of losing details during the process of generating the HDRI.

BRIEF DESCRIPTION OF THE DRAWINGS

To more clearly explain the technical solutions of the embodiments of the present invention, a brief description of the drawings used in the detailed description of the embodiments is provided as follows. It is apparent for an ordinary person skilled in the art that the drawings described below are only illustrative of some embodiments of the present invention, and other drawings can be derived based on those drawings without any creative effort.

DETAIL DESCRIPTION OF THE INVENTION

The embodiments of the present invention provide a method and an apparatus for generating HDRI, which in general only compresses the dynamic range of a base layer of an illuminance diagram and does not compress the dynamic range of a detail layer of the illuminance diagram, so as to achieve the purpose of preserving details in the image.

The technical solutions of the present invention will be described clearly and thoroughly in the following embodiments with the accompanying drawings. Apparently, the described embodiments are only a part but not all of the embodiments of the present invention. Based on the embodiments of the present invention, other embodiments may be derived by those skilled in the art without any creative effort, all of which shall fall within the scope of the present invention.

An embodiment of the present invention discloses a method for generating an HDRI, comprising the following steps:

A: acquiring a first illuminance diagram;

B: generating a second illuminance diagram from the first illuminance diagram;

wherein the second illuminance diagram is formed by fusing a base layer with a compressed dynamic range and detail layers, and the base layer and the detail layers are extracted from the first illuminance diagram;

C: mapping the second illuminance diagram onto the preset color channels to obtain images on the preset color channels; and D: fusing the images on the color channels into the HDRI.

Figure 1:
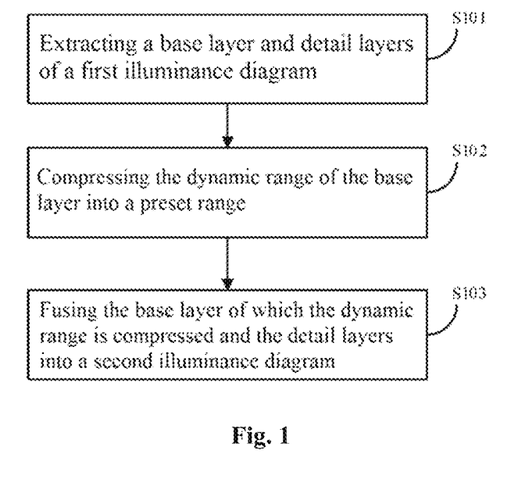
FIG. 1 is a flowchart of generating a second illuminance diagram from a first illuminance diagram in a disclosed method for generating HDRI according to an embodiment of the present invention.
Figure 2:
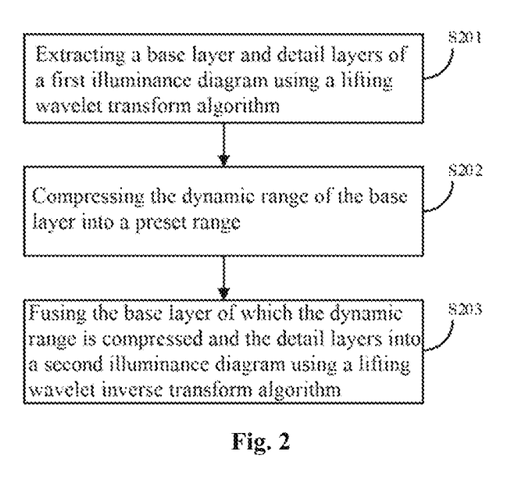
FIG. 2 is another flowchart of generating a second illuminance diagram from a first illuminance diagram in a disclosed method for generating HDRI according to an embodiment of the present invention.

The specific process of step B of this embodiment is shown in FIG. 1 or 2.

The method shown in FIG. 1 may include the following steps:

S101: extracting a base layer and detail layers from a first illuminance diagram;

Typically, an illuminance diagram is used to characterize a brightness value of each pixel point in an image. A base layer of the illuminance diagram refers to low frequency information of the illuminance diagram (i.e., the main energy component of the illuminance diagram), while a detail layer refers to high frequency information of the illuminance diagram. Thus, the detail layer comprises detail information in the illuminance diagram.

S102: compressing the dynamic range of the base layer into a preset range;

The dynamic range refers to the ratio between a maximum value and a minimum value of a physical quantity to be measured, and it may have different meaning for different objects. In terms of a digital image, the dynamic range D refers to the ratio between a maximum brightness value and a minimum brightness value in the digital image:

$$D = L_{max}/L_{min}$$

wherein the brightness is stated in Candela/square meter ($cd/m^2$).

The capability of simultaneously presenting in an image the details of an area with a maximum brightness and an area with a minimum brightness in a natural scene is limited by the dynamic range of the image. In a real natural scene, the brightness has a very broad dynamic range (a range of more than 9 orders of magnitude, e.g., $10^4 \sim 10^{-5}$ $cd/m^2$), and the human vision system is capable of perceiving a scene brightness with a dynamic range of about 5 orders of magnitude. However, the brightness dynamic range that can be achieved by an existing display device may be of about 2 orders of magnitude. Apparently, there would be a mismatch between a brightness dynamic range of a natural object seen in a display device and a brightness dynamic range of the natural object seen in a real world.

In this embodiment, the compression of the dynamic range of the base layer into the preset range can be performed through any appropriate method. For example, the dynamic range of the base layer can be compressed into the preset range by multiplying a number less than 1, and the specific value of that number can be set according to the preset range. In terms of image display, the preset range is the dynamic range that can be displayed by a display device. Other methods for setting the preset range and/or compressing the dynamic range of the base layer can also be used.

S103: fusing the base layer with the compressed dynamic range and the detail layers into a second illuminance diagram.

In the method as shown in FIG. 1, when the dynamic range of an illuminance diagram is compressed, only the dynamic range of the base layer of the illuminance diagram is compressed, while the dynamic range of the detail layers thereof is not compressed. Thus, the completeness of the detail information can be preserved to the largest extent, thereby avoiding the loss of the details.

Furthermore, the method as shown in FIG. 2 may comprise:

S201: extracting a base layer and detail layers of a first illuminance diagram by using a lifting wavelet transform algorithm;

In this embodiment, depending on the characteristics of a lifting wavelet operator, the number of the detail layers may be 3. That is, the detail layers may include detail layers in three different directions.

S202: compressing the dynamic range of the base layer into a preset range;

S203: fusing the base layer with the compressed dynamic range and the detail layers into a second illuminance diagram by using a lifting wavelet inverse transform algorithm.

In the method shown in FIG. 2, the lifting wavelet transform algorithm may be used to extract the base layer and the detail layers from the illuminance diagram, and the lifting wavelet inverse transform algorithm may be used to merge the base layer with the compressed dynamic range and the detail layers. Since the lifting wavelet transform and the lifting wavelet inverse transform are simple and quick, the method described in the present embodiment is capable of not only avoiding the loss of details of an image but also being done simply and quickly. Therefore, the method may be easily implemented in hardware with higher computational efficiency.

It should be noted that, the use of the lifting wavelet algorithm is just an exemplary approach of the present embodiment, which is not intended to be limiting.

Figure 3:
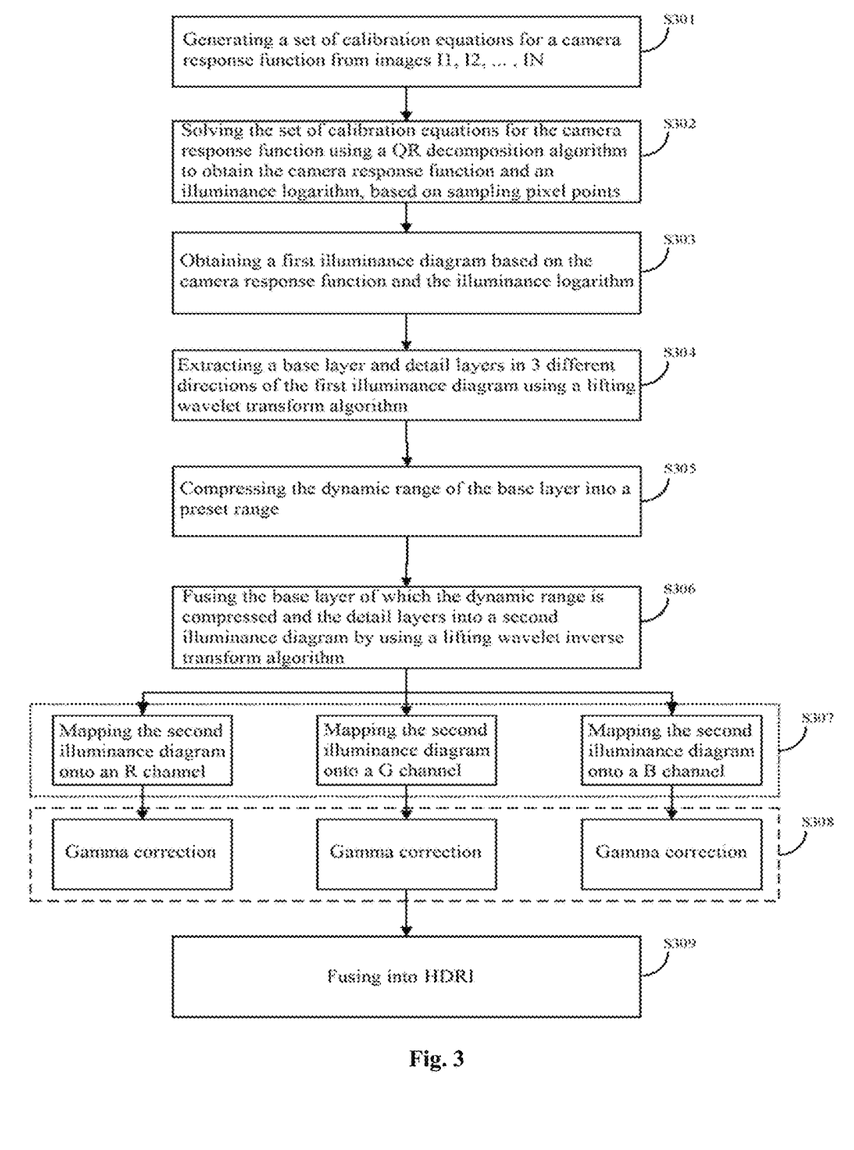
FIG. 3 is a flowchart of a disclosed method for generating HDRI according to an embodiment of the present invention.

The aforementioned method for generating HDRI will be explained in details below. As shown in FIG. 3, the process for generating HDRI may specifically comprise the following steps:

S301: From images I1, I2, . . . , IN, generating a set of calibration equations of a camera response function, where the images I1, I2, . . . , IN may be a set of images having different exposure conditions and may be used to generate the HDRI, i.e., the images I1, I2, . . . , IN may be images corresponding to the HDRI, while N is the total number of the images, and is an integer greater than or equal to 2.

The specific implementation of step S301 may comprise the following steps:

1) acquiring the images I1, I2, . . . , IN; and
2) using the images I1, I2, . . . , IN as known parameters, solving a preset objective function by a least square method to obtain the set of calibration equations for the camera response function.

In some embodiments, the objective function may be:

$$O = \sum_{i=1}^{M}\sum_{j=1}^{N} \omega(Z_{i,j})[g(Z_{i,j}) - \ln E_i - \ln \Delta t_j]^2 + \lambda \sum_{Z=Z_{min}+1}^{Z_{max}-1} \omega(Z_{i,j})[g''(Z_{i,j})]^2$$

where, M is the total number of the pixel points of each image among the known parameters, $g(Z_{i,j})=\ln E_i+\ln \Delta t_j$, $E_i$ is a scene illuminance, $\Delta t_j$ is an exposure time of the current image $Z_{i,j}$, $Z_{i,j}$ is a pixel value of the current image, λ is a control parameter, $\omega(Z_{i,j})$ is a weight function for the current image $Z_{i,j}$, $Z_{min}$ is a minimum value of the pixel value of the current image, and $Z_{max}$ is a maximum value of the pixel value of the current image.

The principle for setting the objective function is as follows:

1) defining the relationship between a camera response curve and a scene illuminance $E_i$, an exposure time $\Delta t_j$ and a pixel value $Z_{i,j}$ of a digital image as:

$$Z_{i,j}=f(E_i \times \Delta t_j)$$

2) assuming the camera response curve is smooth and monotonous such that the function f is invertible, and inverting the above equation and taking the logarithm thereof to let $g=\ln f^{-1}$:

$$g(z_{i,j})=\ln E_i+\ln \Delta t_j$$

3) letting the extrema of Z be $Z_{min}$ and $Z_{max}$ to establish the following objective function:

$$O = \sum_{i=1}^{M}\sum_{j=1}^{N} [g(Z_{i,j}) - \ln E_i - \ln \Delta t_j]^2 + \lambda \sum_{Z=Z_{min}+1}^{Z_{max}-1} [g''(Z_{i,j})]^2$$

Since there are always overexposed pixel points and underexposed pixel points among all the pixel points in an image, a simplest weight function is often added into the objective function:

$$\omega(Z_{i,j}) = \begin{cases} Z - Z_{min} & Z \leq Z_{mid} \\ Z_{max} - Z & Z > Z_{mid} \end{cases}$$

where, $Z_{mid}=(Z_{min}+Z_{max})/2$. So, the final objective function is:

$$O = \sum_{i=1}^{M}\sum_{j=1}^{N} \omega(Z_{i,j})[g(Z_{i,j}) - \ln E_i - \ln \Delta t_j]^2 + \lambda \sum_{Z=Z_{min}+1}^{Z_{max}-1} \omega(Z_{i,j})[g''(Z_{i,j})]^2$$

S302: solving the set of calibration equations for the camera response function by using a QR decomposition algorithm to obtain the camera response function and an illuminance logarithm, based on sampling pixel points selected from the images I1, I2, . . . , IN;

The QR decomposition algorithm first decomposes a coefficient matrix into a product of an orthogonal matrix and an upper triangular matrix, and then calculates the result by back substitution. Compared with the existing solving method of singular value decomposition, the QR decomposition algorithm is simpler, and thus easier to be implemented in hardware.

Figure 4:
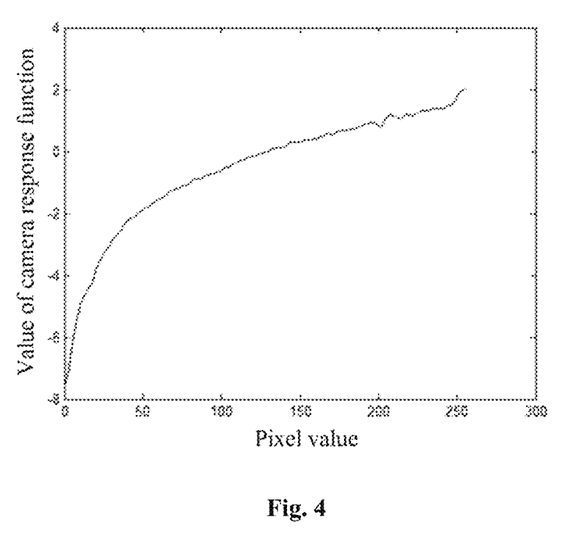
FIG. 4 is a curved graph of a camera response function solved in a disclosed method for generating HDRI according to an embodiment of the present invention.

A curve representation for the camera response function is shown in FIG. 4, with the X-axis represents the pixel value and the Y-axis represents the value of camera response function.

S303: obtaining the first illuminance diagram based on the camera response function and the illuminance logarithm;

The specific implementation of this step may be any appropriate method.

S304: extracting the base layer and the detail layers in 3 different directions of the first illuminance diagram by using a lifting wavelet transform algorithm;

S305: compressing the dynamic range of the base layer into a preset range;

S306: fusing the base layer of which the dynamic range is compressed and the detail layers into the second illuminance diagram by using a lifting wavelet inverse transform algorithm;

S307: mapping the second illuminance diagram onto an R, G and B color channels;

S308: performing a Gamma correction respectively on the images on the R, G and B color channels;

S309: fusing the Gamma-corrected images on the R, G and B color channels into the HDRI.

Since the Gamma correction may correct the brightness deviation of an image displayed on a display, the contrast of HDRI obtained through merging the images with Gamma correction can be significantly improved.

As can be seen from the above steps, the method for generating HDRI as described in the present embodiment has a higher execution speed, is easier to be implemented in hardware, and is able to avoid the loss of details of an image during the process starting from the images I1, I2, . . . , IN to the HDRI. Further, since the details of the image can be preserved, the occurrence of halos in the HDRI can be reduced to a large extent; and the HDRI generated by the method of the present embodiment may have a better contrast.

Figure 5:
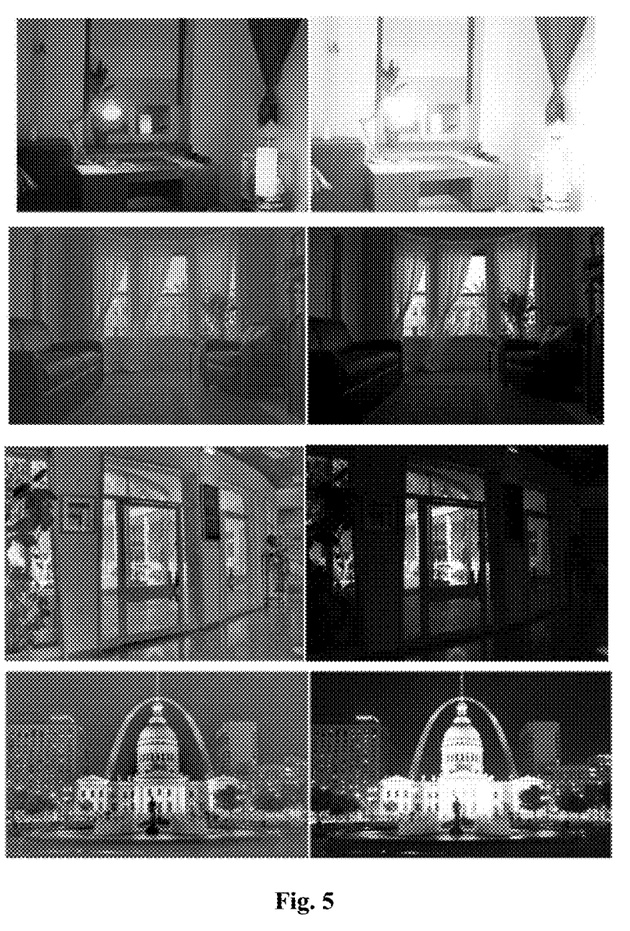
FIG. 5 is a comparison diagram between HDRIs generated by the disclosed method according to the embodiments of the present invention and HDRIs generated by an existing method.

According to the present disclosure, compared with the existing method, the disclosed method according to the embodiments of the present invention can obtain clearer HDRIs as shown in FIG. 5, where the left column shows HDRIs obtained by using the method according to the embodiments of the present invention and the right column shows HDRIs obtained by using the existing method. It can be seen from the display effect that the details of the left column are clearer, and the contrast thereof is more suitable for viewing by human eyes.

Figure 6:
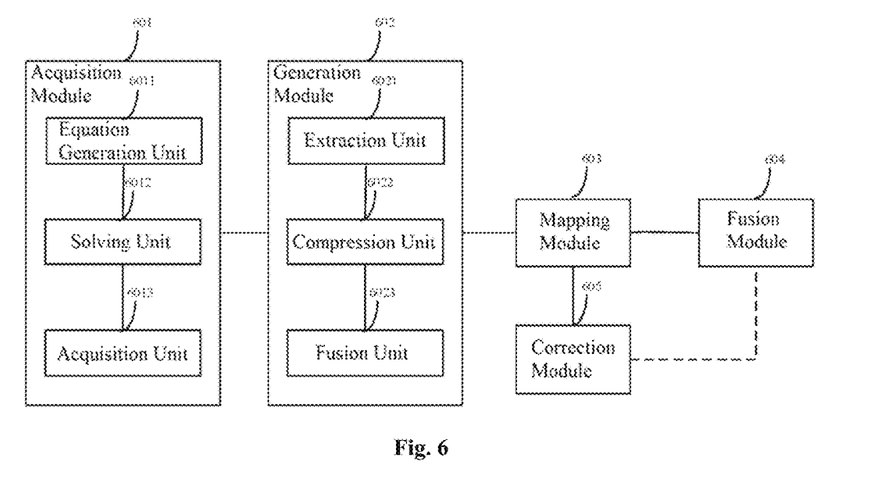
FIG. 6 is a structure diagram of an apparatus for generating HDRI according to an embodiment of the present invention.

In correspondence to the above method embodiments, an embodiment of the present invention further provides an apparatus for generating HDRI as shown in FIG. 6, comprising:

an acquisition module 601 for acquiring a first illuminance diagram;

a generation module 602 for generating a second illuminance diagram from the first illuminance diagram, wherein the second illuminance diagram is formed by fusing a base layer of which the dynamic range is compressed and detail layers, and wherein the base layer and the detail layers are extracted from the first illuminance diagram;

a mapping module 603 for mapping the second illuminance diagram onto preset color channels; and a fusion module 604 for fusing the images on the color channels into the HDRI.

Optionally, the present embodiment may further comprise:

a correction module 605 for performing a Gamma correction respectively to the images on each of the color channels before fusing the images on the color channels into the HDRI.

When the correction module is present, the fusion module may be specifically used for fusing the Gamma-corrected images on the color channels into the HDRI.

The extraction unit may be specifically used for extracting the base layer and the detail layers of the first illuminance diagram by using a lifting wavelet transform algorithm; and the fusion unit may be specifically used for fusing the base layer of which the dynamic range is compressed and the detail layers into the second illuminance diagram by using a lifting wavelet inverse transform algorithm.

In the present embodiment, the acquisition module 601 may specifically comprise:

an equation generating unit 6011 for generating a set of calibration equations for a camera response function from images I1, I2, . . . , IN having different exposure conditions, wherein N is the total number of the images, an integer greater than or equal to 2;

a solving unit 6012 for solving the set of calibration equations for the camera response function by using a QR decomposition algorithm to obtain the camera response function and a illuminance logarithm, based on the sampling pixel points selected from the images I1, I2, . . . , IN; and an acquisition unit 6013 for obtaining the first illuminance diagram based on the camera response function and the illuminance logarithm.

In particular, the specific implementation of the equation generating unit to generate the set of calibration equations for a camera response function from images I1, I2, . . . , IN may be as follows:

The equation generating unit is specifically used for acquiring the images I1, I2, . . . , IN, and solving a preset objective function by a least square method to obtain the set of calibration equations for the camera response function by using the images I1, I2, . . . , IN as known parameters.

Further, the preset objective function may be:

$$O = \sum_{i=1}^{M}\sum_{j=1}^{N} \omega(Z_{i,j})[g(Z_{i,j}) - \ln E_i - \ln \Delta t_j]^2 + \lambda \sum_{Z=Z_{min}+1}^{Z_{max}-1} \omega(Z_{i,j})[g''(Z_{i,j})]^2$$

where M is the number of the pixel points of each image among the known parameters, $g(Z_{i,j})=\ln E_i+\ln \Delta t_j$, $E_i$ is a scene illuminance, $\Delta t_j$ is an exposure time of the current image $Z_{i,j}$, $Z_{i,j}$ is a pixel value of the current image, $\lambda$ is a control parameter, $\omega(Z_{i,j})$ is a weight function for the current image $Z_{i,j}$, $Z_{min}$ is a minimum value of the pixel value of the current image, and $Z_{max}$ is a maximum value of the pixel value of the current image.

Particularly in the present embodiment, the generation module 602 may specifically comprise:

an extraction unit 6021 for extracting the base layer and the detail layers of the first illuminance diagram;

a compression unit 6022 for compressing the dynamic range of the base layer into a preset range; and a fusion unit 6023 for fusing the base layer of which the dynamic range is compressed and the detail layers into the second illuminance diagram.

With the apparatus according to the present embodiment, when the dynamic range of an illuminance diagram is compressed, only the dynamic range of a base layer of the illuminance diagram is compressed whereas the dynamic range of detail layers thereof is not compressed. Thus, the completeness of the detail information can be preserved to the largest extent, thereby avoiding the loss of details.

Specifically, in the present embodiment, the extraction module may extract the base layer and the detail layers of the first illuminance diagram by using a lifting wavelet transform algorithm; and the fusion module may fuse the base layer with the compressed dynamic range and the detail layers into the second illuminance diagram by using a lifting wavelet inverse transform algorithm. Since the lifting wavelet transform and its inverse transform are simple and quick, the apparatus described in the present embodiment is capable of not only avoiding the loss of details of an image but also being done simply and quickly. Therefore, the apparatus may be easily implemented in hardware with higher computational efficiency.

The functionalities of the method according to the embodiments can be stored in a computing device readable storage medium when implemented in the form of software. Based on this understanding, part or all of the technical solution of the embodiments of the present invention can be embodied in the form of a software product stored in a storage medium comprising a number of instructions configured to cause the computing device (such as a personal computer, a server, a mobile computing device or a network device) to execute all or some steps of the method according to various embodiments of the present invention. The storage medium may comprise various mediums such as a flash disk, a removable hard drive, a read only memory (ROM), a random access memory (RAM), a magnetic disk or an optical disk that are capable of storing program codes.

Various embodiments of the present invention are described in a progressive way. The description of each embodiment is focused on the difference between that embodiment and the others, and identical or similar parts among various embodiments can be referred to each other.

The description of the disclosed embodiments can allow those skilled in the art to implement or use the present invention. Various modifications to those embodiments will be apparent to those skilled in the art, and the general principle defined herein can be implemented in other embodiments without departing from the spirit or scope of the present invention. Therefore, the present invention will not be limited to the embodiments disclosed herein, but shall conform to the broadest scope in consistence with the principle and the novel features disclosed herein.

What is claimed is:

1. A method for generating a high dynamic range image (HDRI), comprising:
   acquiring a first illuminance diagram;
   extracting from the first illuminance diagram a base layer and detail layers by using a lifting wavelet transform algorithm, the base layer containing low frequency information of the first illuminance diagram and the detail layers containing high frequency information of the first illuminance diagram;

compressing a dynamic range of the base layer while dynamic ranges of the detail layers remain uncompressed;

generating a second illuminance diagram from the first illuminance diagram by fusing the base layer with the compressed dynamic range and the detail layers using a lifting wavelet inverse transform algorithm;

mapping the second illuminance diagram onto a plurality of preset color channels to obtain images on the plurality of preset color channels; and fusing the images on the plurality of preset color channels into the HDRI.

2. The method of claim 1, wherein acquiring the first illuminance diagram comprises:

generating a set of calibration equations for a camera response function from images I1, I2, . . . , IN having different exposure conditions, wherein N is a total number of the images, which is an integer greater than or equal to 2;

solving the set of calibration equations for the camera response function by using a QR decomposition algorithm to obtain the camera response function and an illuminance logarithm, based on sampling pixel points selected from the images I1, I2, . . . , IN; and obtaining the first illuminance diagram based on the camera response function and the illuminance logarithm.

3. The method of claim 2, wherein generating the set of calibration equations for the camera response function from the images I1, I2, . . . , IN comprises:

acquiring the images I1, I2, . . . , IN; and using the images I1, I2, . . . , IN as known parameters to solve a preset objective function by a least square method to obtain the set of calibration equations for the camera response function.

4. The method of claim 3, wherein the preset objective function comprises:

$$O = \sum_{i=1}^{M}\sum_{j=1}^{N} \omega(Z_{i,j})[g(Z_{i,j}) - \ln E_i - \ln \Delta t_j]^2 + \lambda \sum_{Z=Z_{min}+1}^{Z_{max}-1} \omega(Z_{i,j})[g''(Z_{i,j})]^2$$

wherein, M is a total number of the pixel points of each image among the known parameters, $g(Z_{i,j})=\ln E_i + \ln \Delta t_j$, $E_i$ is a scene illuminance, $\Delta t_j$ is an exposure time of a current image $Z_{i,j}$, $Z_{i,j}$ is a pixel value of a current image, $\lambda$ is a control parameter, $\omega(Z_{i,j})$ is a weight function of the current image $Z_{i,j}$, $Z_{min}$ is a minimum value of the pixel value of the current image, and $Z_{max}$ is a maximum value of the pixel value of the current image.

5. The method of claim 1, before fusing the images on the color channels into the HDRI, further comprising:

performing Gamma correction on the images on the color channels, respectively, wherein fusing the images on the color channels into the HDRI comprises fusing the Gamma-corrected images on the color channels into the HDRI.

6. An apparatus for generating a high dynamic range image (HDRI), comprising:

an acquisition module for acquiring a first illuminance diagram;

a generation module for generating a second illuminance diagram from the first illuminance diagram, wherein the generation module further includes:

an extraction unit for extracting from the first illuminance diagram a base layer and detail layers using a lifting wavelet transform algorithm, the base layer containing low frequency information of the first illuminance diagram and the detail layers containing high frequency information of the first illuminance diagram;

a compression unit for compressing a dynamic range of the base layer while dynamic ranges of the detail layers remain uncompressed;

a fusion unit for fusing the base layer with the compressed dynamic range and the detail layers into the second illuminance diagram using a lifting wavelet inverse transform algorithm;

a mapping module for mapping the second illuminance diagram onto a plurality of preset color channels to obtain images on the plurality of preset color channels; and a fusion module for fusing the images on the plurality of preset color channels into the HDRI.

7. An apparatus of claim 6, wherein the acquisition module comprises:

an equation generating unit for generating a set of calibration equations for a camera response function from images I1, I2, . . . , IN having different exposure conditions, wherein N is a total number of the images, which is an integer greater than or equal to 2;

a solving unit for solving the set of calibration equations for the camera response function by using a QR decomposition algorithm to obtain the camera response function and an illuminance logarithm, based on sampling pixel points selected from the images I1, I2, . . . and an acquisition unit for obtaining the first illuminance diagram based on the camera response function and the illuminance logarithm.

8. An apparatus of claim 7, wherein, for generating a set of calibration equations for a camera response function from images I1, I2, . . . , IN, the equation generating unit is further configured for:

acquiring the images I1, I2, . . . , IN, and using the images I1, I2, . . . , IN as known parameters to solve a preset objective function by a least square method to obtain the set of calibration equations for the camera response function.

9. An apparatus of claim 8, wherein the preset objective function is:

$$O = \sum_{i=1}^{M}\sum_{j=1}^{N} \omega(Z_{i,j})[g(Z_{i,j}) - \ln E_i - \ln \Delta t_j]^2 + \lambda \sum_{Z=Z_{min}+1}^{Z_{max}-1} \omega(Z_{i,j})[g''(Z_{i,j})]^2$$

wherein, M is a total number of the pixel points of each image among the known parameters, $g(Z_{i,j})=\ln E_i + \ln \Delta t_j$, $E_i$ is a scene illuminance, $\Delta t_j$ is an exposure time of a current image $Z_{i,j}$, $Z_{i,j}$ is a pixel value of a current image, $\lambda$ is a control parameter, $\omega(Z_{i,j})$ is a weight function for the current image $Z_{i,j}$, $Z_{min}$ is a minimum value of the pixel value of the current image, and $Z_{max}$ is a maximum value of the pixel value of the current image.

10. An apparatus of claim 6, further comprising:

a correction module for performing Gamma correction to the images on the plurality of color channels, respectively, before fusing the images on the color channels into the HDRI.

11. An apparatus of claim 10, wherein the fusion module fuses the Gamma-corrected images on the color channels into the HDRI.

\* \* \* \* \*